Jan. 3, 1956 W. O. HARRINGTON ET AL 2,729,566
PROCESS FOR PREPARING DEHYDRATED POTATOES
Filed Feb. 7, 1951

INVENTORS
W. O. HARRINGTON
R. M. McCREADY
R. L. OLSON
BY
J. M. Mantell
ATTORNEY

2,729,566

PROCESS FOR PREPARING DEHYDRATED POTATOES

Winfred O. Harrington, Rolland M. McCready, and Robert L. Olson, Berkeley, Calif., assignors to the United States of America as represented by the Secretary of Agriculture Application February 7, 1951, Serial No. 209,896

6 Claims. (Cl. 99—207)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the preservation of potatoes and has as its prime object the provision of processes for preparing dehydrated potatoes of superior rehydration characteristics. Further objects and advantages of this invention will be apparent from the description herein.

Figure 1:
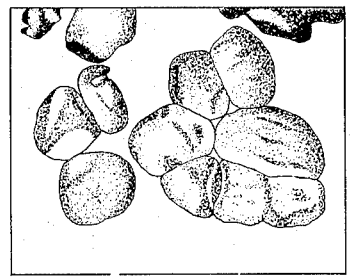
Figure 2:
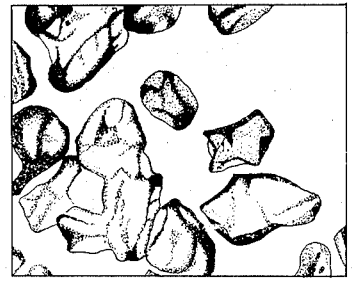

Ways by which the aforesaid objective can be realized in practice will appear from the following detailed description taken in connection with the attached drawing wherein Figs. 1 and 2 are microscopic pictures of potato cells at different stages in our process.

It is well known in the art that potatoes can be preserved by dehydration. One method of preparing dehydrated potatoes involves peeling the potatoes, dicing them, then heat-treating them with hot water or steam. This heat treatment may be sufficient only to blanch the potatoes, i. e., to inactivate their enzyme content or it may be a more prolonged heat treatment to actually cook the potatoes. If the potatoes are only blanched they must be cooked after rehydration whereas if actually precooked, they will be practically ready to eat upon rehydration. After the heat treatment is complete, the blanched or cooked potatoes are then dehydrated. The products so produced have very poor rehydration properties. The point is that during the dehydration process, the potatoes shrink and turn into a hard, vitreous mass which resists penetration by water. As a result, ordinary dehydrated potatoes, even if precooked before dehydration, must be kept in contact with boiling water for at least a half-hour before they absorb sufficient water to be edible.

It has now been found that if potatoes are subjected to a particular sequence of steps, as herein described, a dehydrated product of superior properties, particularly with regard to rehydration, is produced. In essence, our novel process involves subjecting diced potatoes, after cooking, to freezing preferably at a rapid rate. After the cooked dice are frozen, they are subjected to thawing at a controlled rate so as to cause a shrinking of the cells with the establishment of a porous, sponge-like texture throughout the potato tissue. The thawed dice are then subjected to conventional dehydration. The products so produced will rehydrate at a rate at least 30 times that required for rehydrating ordinary dehydrated potatoes. Further, the products are not impaired in flavor or color and retain their natural flavor and color for extended periods of time.

The products of this invention are eminently suited for preparing mashed potatoes. Such a dish can readily be prepared by adding 3 to 5 parts of hot water to one part of the product, stirring or whipping for a few minutes and then adding the usual flavoring agents such as salt, pepper, butter, etc. If desired, the water may be wholly or partly replaced by milk. The mashed potatoes so produced are light and fluffy in character. The products are also adapted for preparing hash, stews, chowders, soups, and so forth.

In physical structure the products of this invention are entirely different from those produced by conventional dehydration. Thus the conventionally dehydrated products are yellow, translucent, and have a vitreous texture. Further, during dehydration the potato pieces shrink so that the final product is much smaller than the original piece and has caved-in sides. On the other hand, the products produced in accordance with this process are white, opaque, and have a soft porous texture so much so that they can readily be crushed between the fingers. Further, during dehydration, the potatoes do not shrink but their dimensions remain substantially intact.

A further advantage of our process is that the dehydration is performed more efficiently than in commercial practice. This results from the fact that in our process, the slow thawing sets up in the potatoes a permanent porous structure, which is retained during dehydration whereby the moisture can diffuse through the potato tissue at a high rate. In conventional practice, the potatoes shrink as the dehydration proceeds and become more and more dense whereby the rate of diffusion decreases as the dehydration proceeds.

An important factor in our process is that we do not subject the potatoes to any mashing operation but merely cut the potatoes with a minimum of cell damage into discrete pieces such as dice or slices. Many processes have been advocated for preparing dehydrated potato products in which the potatoes are mashed after cooking and then dehydrated. These processes are not satisfactory mainly because once the potatoes have been mashed they are very difficult to dry. A mass of mashed potatoes cannot be dried by conventional means as the exterior of the mass would dry to a horny material while the interior would still be moist. Consequently, the drying of such products necessitates the extrusion of the mashed potatoes through a sieve to produce elongated pieces such as "rice" or filaments and subjecting these pieces to dehydration. This extrusion of the mashed material is costly and difficult to perform on a commercial scale as it requires special apparatus and high labor costs. The point is that the mashed potatoes contain considerable fibrous material which rapidly clogs the orifices of the sieve requiring frequent shut downs of the process for removing the fibrous material. Another incident of the sieving operation is that the operation tends to damage the cell structure of the potatoes. When this occurs the gelatinized starch within the cells is released and the final product upon reconstitution forms an unpalatable glutinous or pasty mass. Further, the sieved material must be dried in special apparatus such as a duct or kiln drier wherein the sieved pieces are kept in constant agitation by the air stream in the duct or rotation of the kiln so that the pieces will not stick together. Another difficulty in drying mashed potatoes is that in the mashing operation the potato tissue is broken up into individual cells or small groups of cells. When this material is subjected to dehydration, loss of moisture is slow because the moisture must diffuse through the spaces surrounding the cells or groups of cells. On the other hand, when operating in accordance with this invention, the pieces of potato contain their cells virtually intact and in their natural positions. When this material is subjected to dehydration, the loss of moisture is rapid because the moisture diffuses readily from one cell to the next cells which are in contact therewith. This type of diffusion is rapid because the cells are all in contact and not separated from one another as in the case of mashed potato tissue. Many investigators have attempted to cure the above-outlined defects of the mashed potato dehydration process and many procedures have been advocated for eliminating them. Thus it has been advocated that the potatoes be partially de-watered prior to sieving, that the potatoes be mixed with air, dry milk solids, or dried mashed potatoes from a previous batch prior to sieving. All of these procedures merely add further complications to what basically is an unsatisfactory and expensive procedure. The main point which the investigators have missed is that the potatoes should not be mashed. Thus we have found that when the potatoes are merely cut into dice or slices, frozen rapidly, then thawed slowly and dehydrated, all the disadvantages of the prior art are avoided. By eliminating the mashing step we do away with the sieving operation with its attendant complications such as difficulty of sieving, damage to cell structure, and difficulty of dehydration. By slowly thawing the frozen dice or slices, the swelled starch granules within the cells form a starch sponge thus establishing a permanent porous structure so that the resulting potato pieces can be readily dehydrated while retaining their size and porous structure. Thus we also avoid the disadvantages of the known process of dehydrating cubes or slices by conventional dehydration. The fact that our products are not mashed does not introduce any complications in rehydrating to form mashed potatoes as our product readily breaks apart on stirring with water to produce a fluffy mashed potato dish.

The process of this invention is carried out in practice as follows:

Raw potatoes are subjected to the usual steps of washing and peeling. The peeled potatoes are then comminuted to form discrete pieces of the potato tissue which may be of any desired form such as cubes, elongated cubes, slices, rods, and so forth. It is essential that this comminution operation be performed with the minimum of damage to the cells and cell walls of the potato tissue. To this end the potatoes should be formed into the desired pieces by a cutting action whereby damage to the cellular structure is reduced to a minimum. In general we prefer to dice the potatoes into pieces about 3/8" x 3/8" x 3/8". However the potatoes may also be cut into 3/16" thick slices or may be otherwise comminuted as by other cutting operations into any desired shapes wherein the smallest dimension is preferably not less than about 1/8".

The cut potatoes are then cooked. This cooking may be accomplished by immersing the potatoes in water or they may be subjected to steam. The temperature and the duration of the cooking should be controlled so that the potatoes are cooked yet retain their shape. Thus they should be cooked until tender but not so long that they form a mush. In this cooking operation, the starch within the cells becomes gelatinized (also referred to as swelled or hydrated). This gelatinization is necessary for the formation of the sponge-like texture during the subsequent slow-thawing step. Further, the gelatinization must take place in situ so that the final dehydrated product upon rehydration will form a fluffy mashed potato dish. Overcooking is to be avoided as it will cause rupture of the cell walls whereupon the final dehydrated product upon rehydration will tend to form a glutinous or pasty mass instead of a fluffy product. In general, a 15-30 minute cook has been found to be adequate, depending on the size of the cut pieces, the raw material and the conditions of cooking. It is evident that with any particular lot of potatoes, pilot cooking operations may be run, followed by microscopic examination of the products to determine the proper conditions of cooking to cause gelatinization of the starch without rupture of the cell walls. At this stage of the process, one then has discrete pieces of cooked potato in which the cells are virtually intact and in their original positions and in which cells the starch granules are gelatinized.

After cooking, the potatoes are frozen. Usually, the cooked potatoes are sprayed with cold water or otherwise precooled to avoid over-taxing the capacity of the refrigerator. The chief aim of this freezing step is to lower the temperature of the potatoes to a level below about 28° F. so that they will be in a condition to start the subsequent slow thawing step. The freezing is preferably accomplished at a rapid rate so as to promote the formation of very small ice crystals thus to minimize damage to the cellular structure of the potato tissue. Since rapid freezing is the desideratum, we prefer to subject the cooked, cut potatoes to a low temperature, for example 10° F., or below, preferably 0° F. or below, whereby the potatoes are frozen in an hour or less. To promote heat transfer, we prefer to employ an air blast freezer or other apparatus suitable for high-speed freezing. In any case, the cut potatoes should be spread out in thin layers on the freezing trays so that the individual pieces will be subjected to the low temperature. The potatoes need not be left in the freezer until they reach the same temperature as the freezing medium since the only requirement is that they be frozen, thus the potatoes are generally removed when their temperature is less than 28° F., say about 20° F. to assure complete freezing. It is not essential that the frozen potatoes be immediately subjected to the subsequent slow-thawing procedure. Thus they can be stored while at a temperature of 28° F., or below until convenient to carry out the slow-thawing process. At this stage of our process, one then has discrete pieces of frozen, cooked potato in which the cells are virtually intact and in their original positions and in which cells the starch granules are gelatinized.

After the cooked, cut potatoes are frozen, they are then subjected to a slow thawing procedure. This is a very critical operation in our process and is the step which causes a drastic change in the structure of the potato tissue as explained hereinafter. In this thawing operation, the criterion is to subject the potato tissue to definite temperature for a definite period of time, that is, the potato tissue should be held in the range from about 28° F. to about 32° F. for a period of time of at least 15 minutes, preferably at least 30 minutes. The time may be increased as long as desired above these lower limits without causing any ill effects. That is, once the changes in structure have occurred, they remain constant as long as the temperature does not rise above 130° F. In carrying out the slow-thawing step, many different conditions may be applied depending on the factors involved such as the temperature of the frozen potatoes, the rate of heat transfer in the thawing apparatus, the temperature of the medium used for the thawing, the depth of tray loading and so on. Several examples of suitable techniques are given hereafter it being understood that these examples are applicable only to the specific conditions and the invention is not limited to such techniques since any procedure wherein the potatoes are subjected to the critical temperature (about 28° F. to about 32° F.) for at least the critical time (at least 15 minutes) will be satisfactory.

EXEMPLIFICATION OF SLOW-THAWING TECHNIQUE

Frozen, cooked, diced potatoes at minus 10° F., loaded 3 lbs./sq. ft. on mesh trays, were placed in a room maintained at 40° F. (no forced air circulation). It was noted that it took about 15 hours for the pieces in the centers of the trays to reach 29° F. Thus to assure that all the pieces were kept in the critical temperature range for a sufficient time, the potatoes were left in this 40° F. room for 15½ hours.

In another experiment, the frozen potatoes at the same temperature and same tray loading as above were placed in a room maintained at 33° F. (no forced air circulation). The diced potatoes were left in this room for 24 hours to achieve the desired changes in tissue structure.

Frozen, cooked, diced potatoes at minus 10° F. were immersed in a brine bath maintained at 28°-32° F. The pieces had formed the desired tissue structure after an immersion for ½ to ¾ hour.

Cooked potato dice were placed in a rapid air-blast freezer maintained at minus 20° F. The pieces were removed when their temperature was about 20° F. These pieces were then placed in a room maintained at 30° F. (no forced air circulation) and were of suitable tissue structure when their temperature was 30° F.

As pointed out briefly above, this slow thawing operation is a critical step in our process and causes a drastic change in the structure of the potato tissue. Thus when the potatoes are subjected to the critical temperature range and allowed to remain there for a sufficient period of time, the individual cells shrink. This shrinking of the cells is not accompanied by a shrinking of the entire potato pieces. Thus the outward dimensions of the piece remain constant whereas the individual cells shrink and the interstices between the cells become larger. The cells, originally having convex rounded walls take on a crystalline appearance, the walls being more angular and somewhat caved-in. The responsible action appears to be an egress of water from the cells into the intercellular ice formations. This cell shrinkage or reticulation as it may be called is responsible for the formation of the porous sponge-like structure of the tissue. The formation of the shrunken cells is clearly brought out by the accompanying drawing. The figures represent microscopic pictures of the potato cells at different stages in the process. Fig. 1 illustrates the appearance of the cells after cooking whereas Fig. 2 illustrates the appearance of the cells after the potatoes have been cooked, rapidly frozen, and then thawed slowly in accordance with this invention. A comparison of the two figures shows the marked cell shrinkage after the slow-thawing process.

The most significant aspect of the tissue changes is that it is permanent. Thus during dehydration and subsequent storage, the porous structure is retained. This means that dehydration is rapid and efficient because diffusion of moisture can take place readily. It also means that re-hydration of the final dehydrated product is rapid because the water can readily enter into the porous structure of the potato tissue. We have investigated this phenomenon of cell shrinkage and have noted that it takes place only in a narrow temperature range near the freezing point. Further, the shrinkage of the cells is not instantaneous but requires a definite time period for its completion. If the temperature of the tissue passes through the critical temperature range too rapidly, the cells do not shrink at all.

Since the changes occasioned by the slow thawing are permanent the thawed pieces need not be subjected to dehydration immediately but can be stored under conditions suitable to avoid microbial growth. Thus if the pieces are to be held for a short time, say a day or less they can be allowed to stand at room temperature. For longer periods of storage, they may be held in cool storage (about 40° F.) or even kept in frozen storage (32° F. or less). If re-frozen, no harm is done and when they are ready to be used the slow-thawing need not be repeated, since re-freezing does not alter the shrunken condition of the cells. In conclusion, then, after the slow-thawing operation one then has discrete pieces of potato in which the cells are virtually intact and in their original positions in which cells the starch granules are gelatinized and the cells are shrunken or reticulated thus to form a porous, sponge-like body of tissue.

After the thawing operation, the potatoes are dehydrated. This dehydration can be accomplished by any of the methods as well known in the art of dehydrating fruits, vegetables, and other perishable foodstuffs. Thus the potatoes, after the slow thawing operation, may be placed on trays and placed in a cabinet where they are subjected to a blast of air which may be at room temperature (70° F.) but which is preferably heated to a temperature from about 130° F. to about 160° F. As in conventional dehydration practice, the dehydration is continued until the potatoes have a moisture content less than about 10%, preferably 5% or less. One point to be mentioned is that the potato pieces, while still high in moisture content, should not reach a temperature of about 130° F. or higher since temperatures in this range will cause the cells to re-swell whereby they will lose their porous structure and will dehydrate to form a vitreous, dense mass of low rehydration character. However, after their moisture content has been considerably reduced, no harm is done if the pieces attain a temperature over 130° F. since the amount of water present at this stage is insufficient to re-swell the cells. It is for this reason that the temperature of the dehydrating medium can be as high as 160° F. since during the initial stage of the dehydration, the rapid evaporation of moisture keeps the piece temperature below 130° F. and when the rate of evaporation slows down and the piece temperature rises to equal that of the medium, insufficient moisture is present to cause re-swelling.

It is to be noted that in the prior application of R. M. McCready, R. L. Olson, and W. O. Harrington, Ser. No. 140,951, filed January 27, 1950, now Patent No. 2,707,684, there is disclosed a process of producing dehydrated potatoes of a porous structure and rapid rehydration characteristics. In their process, the diced potatoes are cooked, frozen slowly, then dehydrated. We have now found that when the cooked, diced potatoes are frozen rapidly, then thawed at a controlled slow rate and dehydrated, the final products possess a much finer degree of porosity than in the slow freezing technique of the prior application.

The following examples exhibit the invention in greater detail. It is understood that these examples are submitted only by way of illustration and not limitation. Two of the following experiments (B and C of Example I) are not illustrative of this invention but are included to show the inferior results obtained when operating outside of the scope of this invention.

*Example I*

A batch of potatoes was washed, peeled, and diced (⅜" x ⅜" x ⅜"). The diced potatoes were cooked with steam at atmospheric pressure for 15 minutes. The cooked dice were then cooled with a spray of cold water, drained, and divided into three batches, each batch being separately treated as set forth below:

A. (In accordance with this invention.) The cooked dice were placed one layer deep on mesh trays. The trays were placed in an air-blast freezer at 0° F. whereby the potato dice were rapidly frozen. The trays were then removed from the freezer and placed in a room maintained at 33° F. (no forced circulation of air) for thawing. The rate of thawing was such that the dice were held for 2 hours in the temperature range 28°–32° F. The thawed dice were then placed in a cabinet dehydrator where they were subjected to a blast of air at 150° F. until their moisture content was about 3%. The dehydrated products were observed to have a smooth surface and had approximately the same dimensions as the original dice. In color the products were opaque white and in texture the products were porous and could be easily crushed between the fingers. A rehydration test showed that the products would absorb twice their weight of water at 70° F. in 1 minute.

B. (Not in accordance with this invention—influence of rapid thawing.) The second batch of cooked diced potatoes was placed one layer deep on mesh trays. The trays were placed in an air-blast freezer at 0° F., whereby the potato dice were rapidly frozen. The trays were removed from the freezer and immediately placed in a cabinet dehydrator where they were subjected to a blast of air at 150° F. until their moisture content was about 3%. Due to the rapid thawing occasioned by the hot air in the dehydrator, the products so obtained were similar to those obtained by conventional dehydration practice, i. e., they were wrinkled and shrunken from their original dimensions, they were yellow and translucent and of a vitreous texture. The pieces were so hard that they could only be fractured by striking with a sharp instrument. The rehydration test showed that this product absorbed twice its weight of water at 70° F. in 60 minutes.

C. (Conventional dehydrated potatoes.) The third batch of cooked dice was dehydrated in a cabinet dryer with a blast of air at 150° F. The products were wrinkled and shrunken from their original dimensions, they were yellow and translucent and of a vitreous texture. The pieces were so hard that they could be fractured only by striking with a hard instrument. The rehydration test showed that this product absorbed twice its weight of water at 70° F. in 30 minutes.

*Example II*

PREPARATION OF MASHED POTATOES 50 grams of the dehydrated potato dice as prepared in Example I-A was placed in a bowl to which was added 200 ml. hot water (190° F.) and 50 ml. of whole milk at room temperature. The mixture was whipped with a fork for 3 minutes whereby a mashed potato dish of a fluffy texture and excellent flavor was produced.

*Example III*

A batch of potatoes was washed, peeled, and diced (3/16" x 3/8" x 3/8") The diced potatoes were cooked with steam for 25 minutes, cooled to room temperature, then frozen in a forced-draft freezer at minus 10° F. The frozen dice were placed in a brine solution (2% NaCl) maintained at 32° F. The dice were allowed to remain in this brine for one hour to thaw then dehydrated in a cabinet dehydrator with a blast of air at 130° F. The products had a porous texture and were similar to those produced in Example I-A.

*Example IV*

A lot of potatoes was washed, peeled, and diced (3/8" x 3/8" x 3/8"). The diced potatoes were cooked with steam for 25 minutes, cooled with a cold water spray, drained, and loaded 1/2" to 3/4" deep on wire-mesh trays. These trays were placed in a forced draft freezer at minus 10° F. The trays were removed in 2 hours, the dice being frozen, and placed in a room maintained at 34° F. where they were allowed to remain overnight. The thawed dice were then dehydrated in a cabinet dehydrator at 130° F. The products had a porous texture and were similar to those produced in Example I-A.

Having thus described the invention, what is claimed is:

1. A process for preparing dehydrated potatoes of superior rehydration properties which comprises cutting raw potatoes into discrete pieces, cooking the cut potatoes to produce discrete pieces of cooked potato in which the cells are virtually intact and in their original positions, rapidly freezing the cooked, cut potatoes, then thawing the frozen potatoes at such a rate that the potato tissue is maintained in the temperature range from about 28° F. to about 32° F. for at least 15 minutes thereby to cause the cells to shrink and dehydrating the thawed potatoes.

2. A process for preparing dehydrated potatoes of superior rehydration properties which comprises cutting raw potatoes into discrete pieces, the smallest dimension of which is not less than about one eighth of an inch, cooking the cut potatoes to produce discrete pieces of cooked potato in which the cells are virtually intact and in their original positions, rapidly freezing the cooked, cut potatoes, then thawing the frozen potatoes at such a rate that the potato tissue is maintained in the temperature range from about 28° F. to about 32° F. for at least 15 minutes thereby to cause the cells to shrink, and dehydrating the thawed potatoes by subjecting them to air at a temperature from about 70° F. to about 160° F.

3. A process for preparing dehydrated potatoes of superior rehydration properties which comprises providing discrete pieces of cooked potato in which the cells are virtually intact and in their original positions, the smallest dimension of the pieces being not less than about one eighth of an inch, rapidly freezing the cooked pieces, then thawing the frozen pieces at such a rate that the potato tissue is maintained in the temperature range from about 28° F. to about 32° F. for at least 15 minutes thereby to cause the cells to shrink, and dehydrating the thawed pieces.

4. A process for preparing dehydrated potatoes of superior rehydration properties which comprises providing discrete pieces of cooked potato in which the cells are virtually intact and in their original positions, rapidly freezing the cooked pieces, then thawing the frozen pieces at such a rate that the potato tissue is maintained in the temperature range from about 28° F. to about 32° F. for at least 15 minutes thereby to cause the cells to shrink, and dehydrating the thawed pieces by subjecting them to air at a temperature from about 70° F. to about 160° F.

5. A process for preparing dehydrated potatoes of superior rehydration properties which comprises providing discrete pieces of cooked potato in which the cells are virtually intact and in their original positions and in which cells the starch granules are gelatinized, rapidly freezing the cooked pieces by subjecting them to a forced draft of a refrigerating medium maintained at not higher than 10° F., then thawing the frozen pieces at such a rate that the potato tissue is maintained in the temperature range from about 28° F. to about 32° F. for at least 15 minutes thereby to cause the cells to shrink and to induce starch sponge formation of the swelled starch granules within the cells, and dehydrating the thawed pieces by subjecting them to air at a temperature from about 70° F. to about 160° F.

6. A process for preparing dehydrated potatoes of superior rehydration properties comprising: comminuting raw, peeled potatoes into pieces the smallest dimension of which is not less than about 1/8 of an inch, cooking the pieces until tender, but not so long as to form a mush, the cells of the potato becoming gelatinized, without rupture of the cell walls, resulting in discrete pieces of cooked potato in which the cells are substantially intact and in their original positions, rapidly freezing the pieces of potato by spreading them out in thin layers and subjecting them to a blast of cold gas at a temperature not higher than about 0° F., for a time at least until they are completely frozen, subjecting the discrete pieces of frozen, cooked potato to a slow thawing process during which thawing process the potato tissue is held in the range of about 28° F. to about 32° F. for a period of time of at least 30 minutes, whereby the individual cells shrink and the interstices between the cells become larger, the outward dimensions of each piece remaining constant except that the original convex rounded walls taking on a crystalline appearance, the walls of the cells becoming angular and somewhat caved-in, resulting in a porous sponge-like structure of the tissue, and dehydrating the pieces to a moisture content of less than about 10% at a temperature from about 70° F. to about 160° F., but maintaining the temperature during at least the initial stage of dehydration at no higher than about 130° F. to avoid change in the porous structure.

References Cited in the file of this patent

UNITED STATES PATENTS

| | | |
|---|---|---|
| 2,278,472 | Musher | Apr. 7, 1942 |
| 2,523,552 | Birdseye | Sept. 26, 1950 |